United States Patent
Shimizu et al.

(10) Patent No.: US 7,648,057 B2
(45) Date of Patent: *Jan. 19, 2010

(54) ULTRASONIC FLANGE JOINING METHOD

(75) Inventors: Arinori Shimizu, Okazaki (JP); Yuuichi Aoki, Chita-gun (JP); Hiroyasu Morikawa, Nagoya (JP)

(73) Assignee: Denso Corporation, Kariya (JP)

( * ) Notice: Subject to any disclaimer, the term of this patent is extended or adjusted under 35 U.S.C. 154(b) by 215 days.

This patent is subject to a terminal disclaimer.

(21) Appl. No.: 11/725,540

(22) Filed: Mar. 19, 2007

(65) Prior Publication Data

US 2007/0228107 A1 Oct. 4, 2007

(30) Foreign Application Priority Data

Mar. 20, 2006 (JP) .............................. 2006-077044

(51) Int. Cl.
B23K 1/06 (2006.01)
B29C 65/00 (2006.01)

(52) U.S. Cl. .................................. 228/110.1; 156/73.1

(58) Field of Classification Search ... 228/110.1–111.5, 228/1.1; 156/73.6, 64, 73.1–73.4, 358, 580.1
See application file for complete search history.

(56) References Cited

U.S. PATENT DOCUMENTS

| 6,494,976 | B1 * | 12/2002 | Hayashi et al. | ............. | 156/73.1 |
| 6,672,503 | B2 * | 1/2004 | Or et al. | .................. | 228/180.5 |
| 6,811,630 | B2 * | 11/2004 | Tominaga et al. | .......... | 156/73.1 |
| 6,815,120 | B2 * | 11/2004 | Inoue et al. | ................. | 429/211 |
| 7,017,791 | B2 | 3/2006 | Higashiyama | | |
| 7,374,626 | B2 * | 5/2008 | Van Der Leden | .......... | 156/73.1 |
| 2007/0187457 | A1 * | 8/2007 | Minamitani et al. | .......... | 228/1.1 |
| 2007/0221709 | A1 | 9/2007 | Aoki et al. | | |

FOREIGN PATENT DOCUMENTS

| JP | 11-047956 | 2/1999 |
| JP | 2001-246479 | 9/2001 |
| JP | 2006-212692 | 8/2006 |
| JP | 2006-212693 | 8/2006 |
| JP | 2006-272444 | 10/2006 |

OTHER PUBLICATIONS

Office Action dated Jun. 15, 2009 issued in the U.S. Appl. No. 12/378,788.

* cited by examiner

Primary Examiner—Jessica L. Ward
Assistant Examiner—Carlos Gamino
(74) Attorney, Agent, or Firm—Harness, Dickey & Pierce, PLC

(57) ABSTRACT

In an ultrasonic joining method for joining a flange portion of a first member to a portion of a second member, a first horn and a second horn are arranged on the flange portion on a side opposite to the second member, and the first horn is vibrated in a condition that the second horn is biased against the first horn and the first horn and the second horn are pressed against the flange portion such that the flange portion is vibrated while being pressed against the portion of the second member. Because the first horn is vibrated in a condition that the first horn and the second horn are pressed against each other at press-contact portions thereof, vibration of the first horn is transferred to the second horn through the press-contact portions.

6 Claims, 5 Drawing Sheets

ULTRASONIC FLANGE JOINING METHOD

CROSS REFERENCE TO RELATED APPLICATION

This application is based on a Japanese Patent Application No. 2006-77044 filed on Mar. 20, 2006, the disclosure of which is incorporated herein by reference.

FIELD OF THE INVENTION

The present invention relates to an ultrasonic joining method, an ultrasonic joining device, and a unit joined by ultrasonic joining.

BACKGROUND OF THE INVENTION

To join two metal members, various ultrasonic joining methods are known. For example, Japanese Unexamined Patent Publication No. 2001-246479 discloses an ultrasonic joining method for joining a straight pipe having a flange portion at its first end to a part of a header tank of a heat exchanger.

In this method, the flange portion is vibrated while being pressed against the part of the header tank with a predetermined pressure by a horn in a condition that the heat exchanger is held by an anvil. Thus, oxidation films of opposed surfaces of the flange portion and the part of the header tank are broken due to friction between them. At this time, frictional heat occurs between the contact surface of the flange portion and the part of the header. Also, because newly-formed clean surfaces of the flange portion and the part of the header tank come very close to each other, an atomic force occurs between the surfaces. As such, the flange portion of the pipe is joined to the part of the header tank by the frictional heat and the atomic force.

In this case, the horn has a cylindrical shape so as to surround a periphery of the pipe. Thus, the horn is set on a surface of the flange portion on a side opposite to the header tank through a second end of the pipe, the second end being opposite to the flange portion.

However, if the pipe has a bent or an overhang portion at the second end, it is difficult to set the horn through the second end of the pipe. Therefore, it is proposed to use a horn having a semicylindrical shape. Although this horn can be set to the flange portion from a radial outside of the pipe, it is necessary to perform the ultrasonic joining part by part in a circumferential direction of the flange portion. In this case, when a first part of the flange portion is pressed for joining, a second part that is not joined yet will be deformed. This affects joining of the first part. Also, the first part, which has been already joined, will be damaged by vibration while the second part is joined.

Also, it is also proposed to divide the cylindrical horn into plural horn segments in the circumferential direction in Japanese Patent Application No. 2005-99329. The horn segments are arranged with clearances between them in the circumferential direction, and respectively connected to oscillators. The horn segments are vibrated by the respective oscillators at the same phase and amplitude.

SUMMARY OF THE INVENTION

It is an object of the present invention to provide an ultrasonic joining method and an ultrasonic joining apparatus capable of improving the quality of joined portion and a unit joined by ultrasonic joining with the improved quality of joining.

It is another object of the present invention to provide an ultrasonic joining method and an ultrasonic joining apparatus in which vibrations of plural horns are easily controlled and a unit joined by the same.

It is further another object of the present invention to provide an ultrasonic joining method capable of simplifying an apparatus for the same, an ultrasonic joining apparatus with a simplified structure, and a unit joined by the same.

According to an aspect of an ultrasonic joining method, a flange portion of a first member is placed on a portion of a second member to be joined, and a first horn and a second horn of a horn unit are arranged in a circumferential direction of the flange portion on a side opposite to the second member with respect to the flange portion. Further, vibration is applied to the first horn by an oscillator in a condition that the first horn and the second horn are pressed against the flange portion so that the flange portion is pressed against the portion of the second member. Thus, the flange portion is vibrated in a condition pressed against the portion of the second member, and hence joined to the portion of the second member. In the arranging, the second horn is pressed against the first horn such that the first horn and the second horn are in contact with each other at press-contact portions thereof. In a condition that the second horn is pressed against the first horn, the first horn is vibrated by the oscillator so that vibration of the first horn is transferred to the second horn through the press-contact portions.

Accordingly, since the first horn is vibrated in a condition that the second horn is pressed against the first horn, the first horn and the second horn are integrally vibrated. As such, the whole of the flange portion is substantially uniformly joined to the portion of the second member Therefore, the quality of joining improves, as compared with a case where plural horns are arranged in the circumferential direction with clearances therebetween.

In addition, since the second horn is vibrated by transferring the vibration of the first horn to the second horn through the first and second press-contact portions, it is not necessary to control vibration-excitation to the second horn separately from the first horn. Thus, the control of vibration is eased. Further, since it is not necessary to apply vibration to the second horn by using a second oscillator, the flange portion is joined to the second member by the ultrasonic joining apparatus with a simple structure.

Since the quality of joined portion improves, the method is effective to join members that requires fluid-tightness. For example, the first member may be a tubular member having the flange portion at its end, and the second member may have an opening within the portion to which the flange portion is joined. Thus, the flange portion is joined to the portion of the second member such that a passage of the tubular first member is in communication with the opening of the second member.

According to an aspect of an ultrasonic joining apparatus, a horn unit has a first horn and a second horn for applying vibration to a flange portion of a first member while being pressed against the flange portion. The first horn is connected to an oscillator to be vibrated. The first horn has a first press-contact portion and the second horn has a second press-contact portion. The first horn and the second horn are connectable such that the first press-contact portion and the second press-contact portion are in contact with and pressed against each other and an opening for receiving at least a portion of the first member is defined between the first horn and the second horn. Also, the second horn is held to be pressed against the first horn such that vibration of the first horn is transferred to the second horn through the first and second press-contact portions.

Accordingly, since the second horn is held to be pressed against the first horn, the vibration of the first horn is transferred to the second horn through the first and second press-contact portions. As such, it is not necessary to provide the second horn with a second oscillator. Therefore, a structure of the ultrasonic joining apparatus is simplified.

According to an aspect of a unit joined by ultrasonic joining, a first member has a first portion and a second portion flanged from the first portion at an end of the first portion. The flanged second portion of the first member is joined to a portion of a second member by ultrasonic joining using a horn unit including a first horn connected to an oscillator and a second horn. The flanged second portion is joined by applying vibration to the first horn in a condition that the second horn is pressed against the first horn and the first horn and the second horn are pressed against the flanged second portion. The first horn and the second horn have projections over surfaces that are pressed against the flanged second portions at substantially uniformed intervals. The first portion of the first member has at least one of a bent and an overhang portion extending in a radial direction. The flanged second portion has impressions on a surface due to the projections of the first horn and the second horn, the surface being on a side opposite to the second member.

Accordingly, even if the first member is a bent tube or has the overhang portion, the unit has the improved quality at the joining portions.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXAMPLE EMBODIMENT

Figure 1:
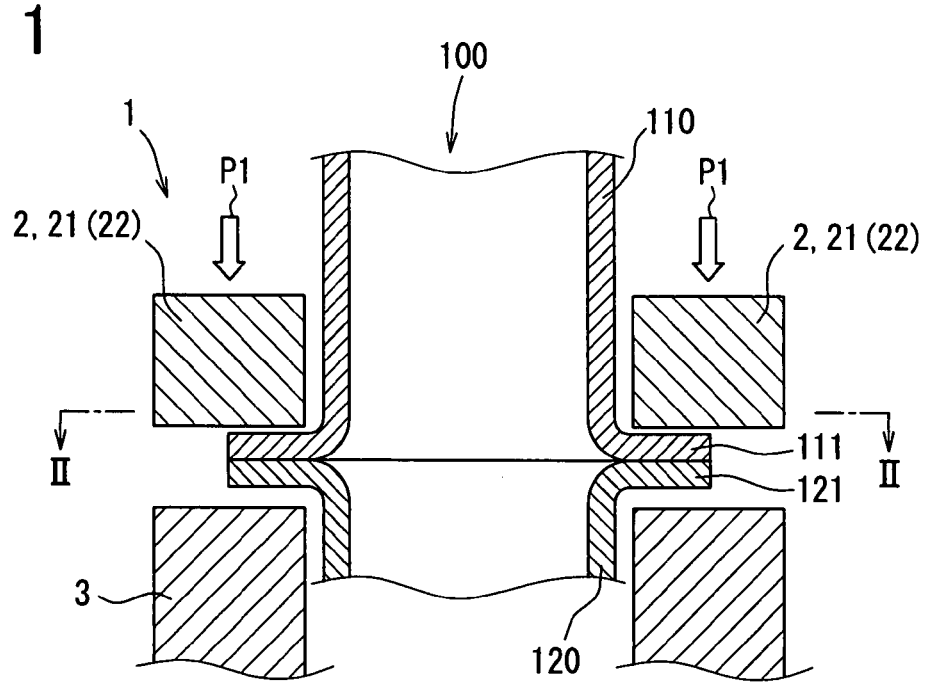
FIG. 1 is a schematic cross-sectional view of a part of an ultrasonic joining apparatus and pipes to be joined by the ultrasonic joining apparatus according to an embodiment of the present invention.

An embodiment of the present invention will be described with reference to FIGS. 1 through 6C. FIG. 1 shows a part of an ultrasonic joining apparatus 1 for joining a first member and a second member, thereby producing a unit 100 joined by ultrasonic joining.

Figure 4:
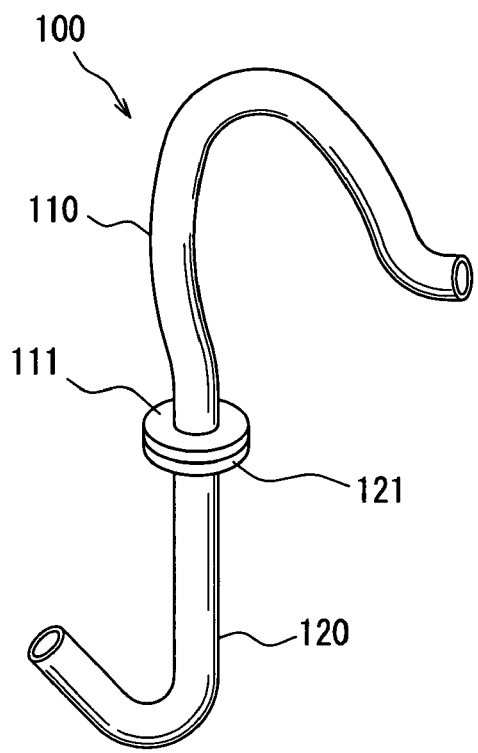
FIG. 4 is a perspective view of the pipes joined by the ultrasonic joining apparatus according to the embodiment.

The first member is for example a pipe member (first pipe) 110 made of metal and has a tubular portion and a first flange portion 111 at a first end of the tubular portion. For example, the first flange portion 111 has a circular shape and extends in a circumferential direction. The tubular portion of the first pipe 110 may have any shape. For example, the tubular portion of the first pipe 110 is curved or bent toward its second end, as shown in FIG. 4. Thus, the first member 110 is provided as a bent pipe, for example.

Likewise, the second member is for example a pipe member (second pipe) 120 made of metal and has a tubular portion and a second flange portion 121 to be joined with the first flange portion 111, at a first end of the tubular portion. For example, the second flange portion 121 has a circular shape and extends in a circumferential direction. The tubular portion of the second pipe 110 may have any shape. For example, the tubular portion of the second pipe 120 is curved or bent toward its second end, similar to the first pipe 110. Thus, the second member 120 is provided as a bent pipe, for example.

Figure 2:
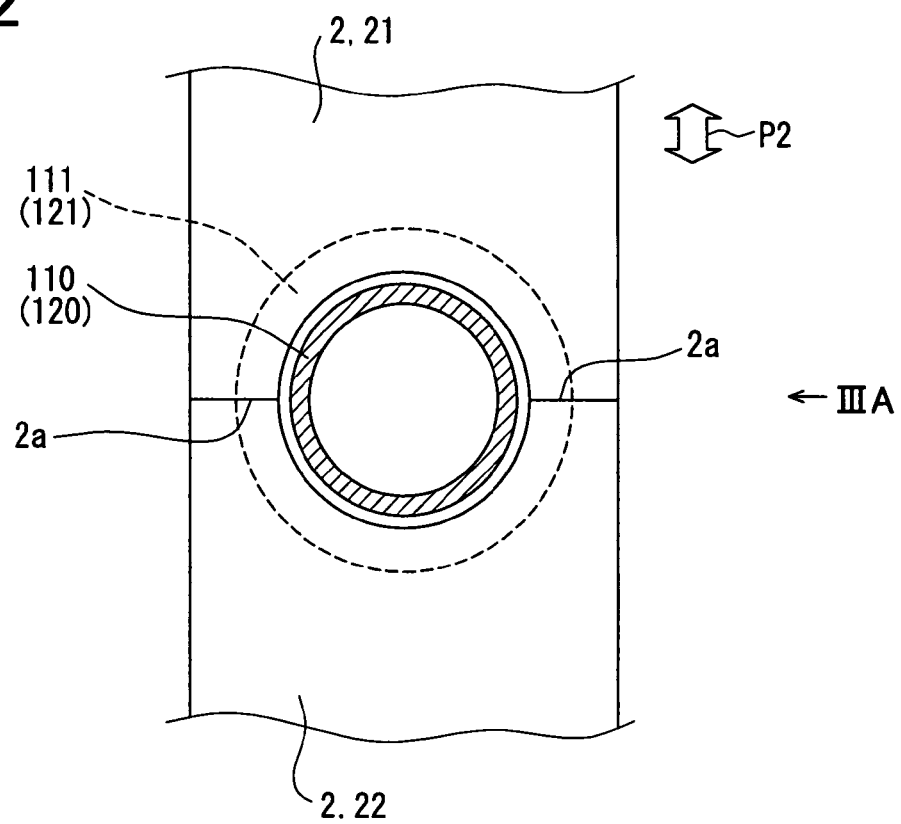
FIG. 2 is a cross-sectional view taken along a line II-II in FIG. 1.

The ultrasonic joining apparatus 1 has a horn unit 2 for pressing the first pipe 110 against the second pipe 120 as shown by an arrow P1 and applying vibration in a direction parallel to the first flange portion 111 as shown by an arrow P2 in FIG. 2. The ultrasonic joining apparatus 1 further has an anvil unit 3 for supporting the second pipe 120.

The horn unit 2 is divided into plural horns in a circumferential direction of the first flange portion 111. Namely, the horn unit 2 includes plural horns that are arranged along a circumference of the tubular portion of the first pipe 110.

For example, the horn unit 2 includes a first horn 21 and a second horn 22, as shown in FIG. 2. Each of the first and second horns 21, 22 has a semicircular shaped recess on an end surface thereof. Thus, in a condition that the first horn 21 and the second horn 22 are disposed such that the end surfaces on which the recesses are formed are opposed to each other, a substantially circular opening is provided by the first horn 21 and the second horn 22.

Figure 5A:
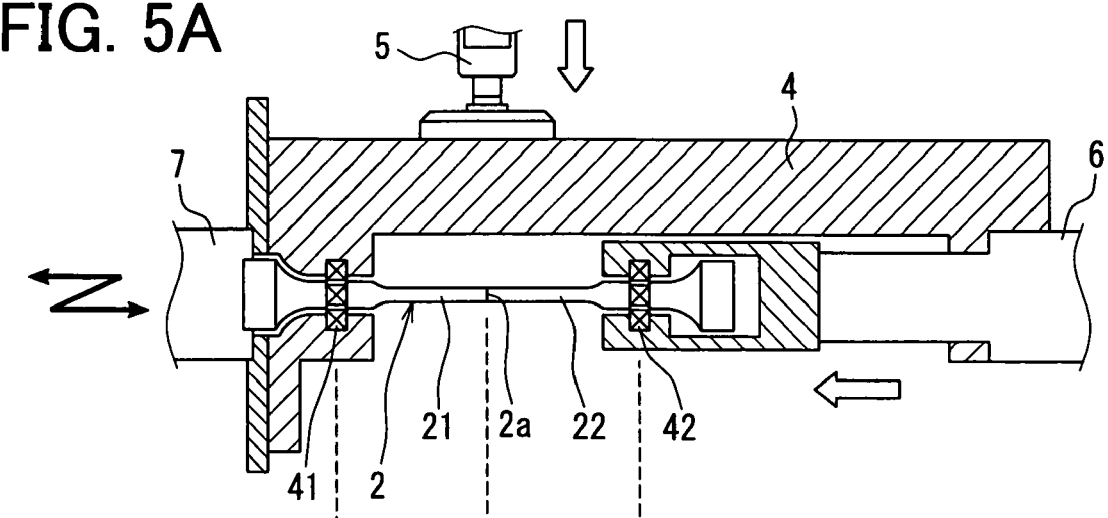
FIG. 5A is a schematic cross-sectional view of the ultrasonic joining apparatus according to the embodiment.

As shown in FIG. 5A, the first horn 21 is connected to an oscillator (vibration exciting unit) 7, and the second horn 22 is connected to a biasing-load applying unit 6. The biasing-load applying device unit 6 is configured to move the second horn 22 toward and away from the first horn 21. The second horn 22 can be biased toward the first horn 21 by the biasing-load applying unit 6 such that the first horn 21 and the second horn 22 are in contact with and pressed against each other at press-contact portions 2a, which are defined by the end surfaces of the first horn 21 and the second horn 22.

In the example shown in FIG. 2, the press-contact portions 2a are located on opposite sides with respect to the first pipe 110 arranged in the circular opening formed by the first and second horns 21, 22. In other words, the horn unit 2 is divided into two horns 21, 22 on a plane that intersects the tubular portion of the first pipe 110 arranged in the circular opening.

The ultrasonic joining apparatus 1 further has a bracket 4 and a joining-load applying unit 5. The joining-load applying unit 5 is connected to the bracket 4. The first horn 21 and the second horn 22 are supported by the same bracket 4. Although not illustrated in FIG. 5A, the anvil unit 3 is located on a side opposite to the bracket 4 with respect to the first and second horns 21, 22. The joining-load applying unit 5 moves the bracket 4 toward the anvil unit 3, i.e., in a downward direction in FIG. 5A so as to exert pressure to the portions to be joined.

The bracket 4 has a first supporting portion 41 and a second supporting portion 42. The biasing-load applying unit 6 is connected to the second supporting portion 42. The first horn 21 is supported by the first supporting portion 41 and the second horn 22 is supported by the second supporting portion 42.

Figure 5B:
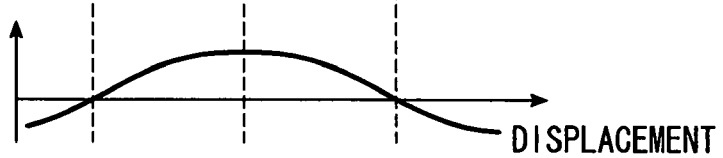
FIG. 5B is a graph showing vibration amplitude of the horns according to the embodiment.

As shown in FIG. 5A, the oscillator 7 applies vibration to the first horn 21 in a longitudinal direction i.e., in a direction parallel to joining surfaces of the first and second pipes 110, 120 in a condition that the second horn 22 is biased toward the first horn 21 such that the first horn 21 and the second horn 22 are in press-contact with each other at the press-contact portions 2a. Thus, the first horn 21 vibrates (resonate) in ½ wavelength of sound wave, as shown in FIG. 5B. Further, as the vibration of the first horn 21 is transferred to the second horn 22 through the press-contact portions 2a, the second horn 22 vibrates (resonates) in ½ wavelength of sound wave.

That is, a vibration system of the horn unit 2 including the first horn 21 and the second horn 22 vibrates (resonates) in a wavelength of sound wave. In this case, the first horn 21 is a vibration-exciting horn that is directly excited by the oscillator 7, and the second horn 22 is a resonance horn that is resonated by the first horn 21.

As shown in FIG. 5A, the first and second supporting portion 41, 42 are located at positions where the vibration amplitude when the first and second horns 21, 22 vibrate is in the minimum level, which is so-called a node point or a vibration node. Thus, it is less likely that the first and second supporting portions 41, 42 will hamper the vibration of the first and second horns 21, 22.

On the other hand, the press-contact portions 2a of the first and second horns 21, 22 are located at a position where the vibration amplitude when the first and second horns 21, 22 vibrate is in the maximum level, which is so-called a vibration antinode, i.e., in an area where the vibration amplitude is substantially in the high level. As such, the vibration of the first horn 21 is readily transferred to the second horn 22.

Figure 3A:
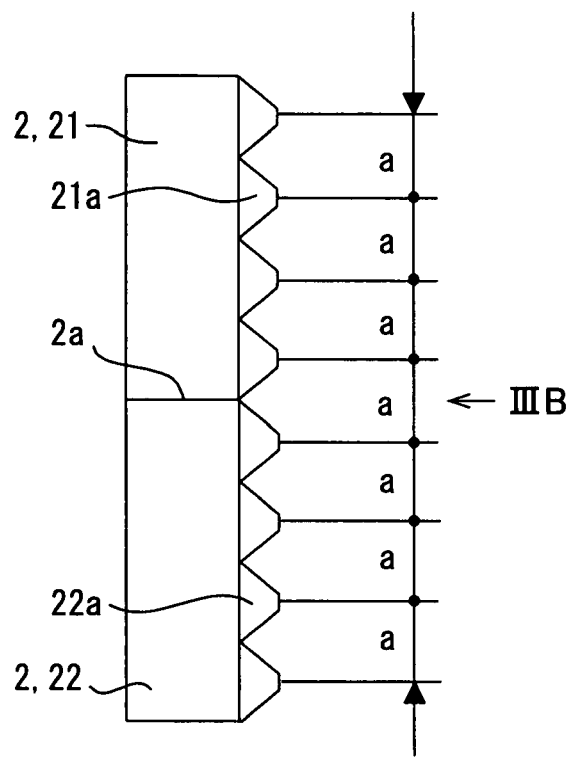
FIG. 3A is a schematic side view of horns of the ultrasonic joining apparatus when viewed along an arrow IIIA in FIG. 2.
Figure 3B:
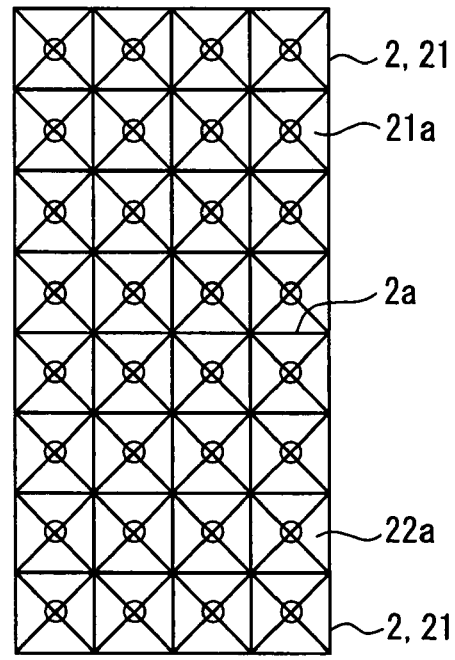
FIG. 3B is a plan view of the horns when viewed along an arrow IIIB in FIG. 3A.

As shown in FIGS. 3A and 3B, the first and second horns 21, 22 have projections 21a, 22a on the surfaces that face the flange portion 111 of the first pipe 110. The projections 21a, 22a are arranged at predetermined intervals (pitch) a. Each of the projections 21a, 22a has a rectangular cone shape, for example.

Further, in a condition that the first and second horns 21, 22 are pressed against at the press-contact portions 2a, the projections 21a adjacent to the press-contact portion 2a of the first horn 21 and the projections 22a adjacent to the press-contact portion 2a of the second horn 22 are also spaced at predetermined internals a. That is, the projections 21a, 22a are arranged at predetermined intervals a over the surfaces of the first and second horns 21, 22. For example, the interval a is set in a range between 0.8 mm and 1.2 mm, and each projections 21a, 22a has the height in a range between 0.35 mm and 0.5 mm.

Next, the ultrasonic joining method using the ultrasonic joining apparatus 1 will be described with reference to FIGS. 6A to 6C.

Figure 6A:
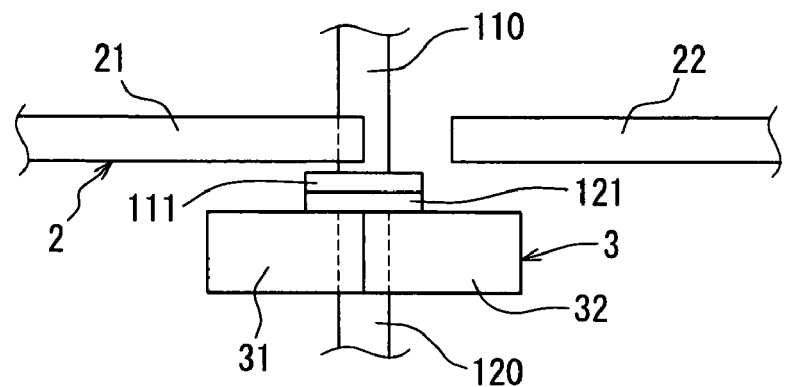
FIGS. 6A to 6C are schematic views for respectively showing different steps of ultrasonic joining by the ultrasonic joining apparatus according to the embodiment.

First, as show in FIG. 6A, the second pipe 120 is set on the anvil unit 3 such that the second flange portion 121 faces upward, in a condition that the first horn 21 and the second horn 22 are separated. For example, the anvil unit 3 is constructed of a first anvil 31 and a second anvil 32. The first anvil 31 and the second anvil 32 are separable in a circumferential direction of the second pipe 120 so as to easily set the second pipe 120 to the anvil unit 3, even when the second pipe 120 is the bent pipe. Then, the first pipe 110 is set such that the first flange portion 111 overlaps with the second flange portion 121.

Figure 6B:
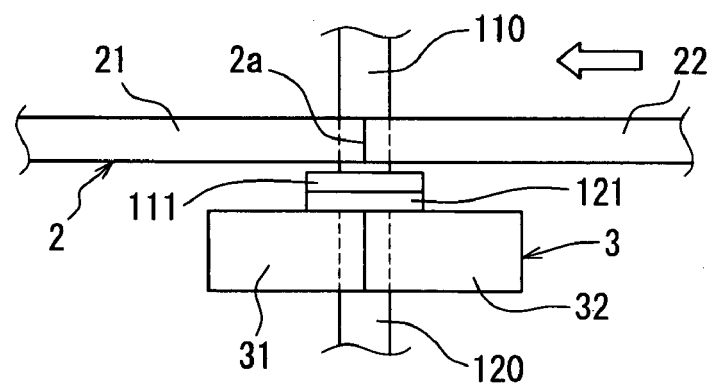

Next, as shown in FIG. 6B, the second horn 22 is brought in contact with the first horn 21 such that the first pipe 110 is located in the circular opening defined by the recesses of the first horn 21 and the second horn 22. In other words, the first horn 21 and the second horn 22 are arranged such that the first pipe 110 is surrounded in the circumferential direction. At this time, the first horn 21 and the second horn 22 are pressed against each other at the press-contact portions 2a.

Here, the recesses of the first and second horn 21, 22 are formed such that the first and second horns 21, 22 do not contact an outer peripheral surface of the tubular portion of the first pipe 110 when the vibration is applied. In other words, a clearance remains between the first and second horns 21, 22 and the tubular portion of the first pipe 110 in a radial direction, as shown in FIG. 2.

Figure 6C:
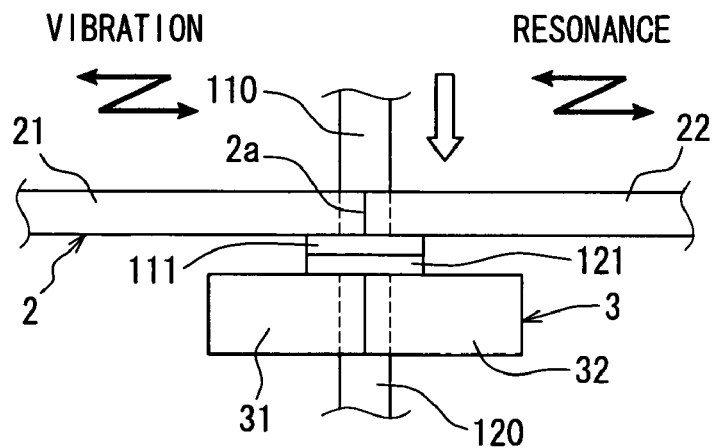
Figure 9:
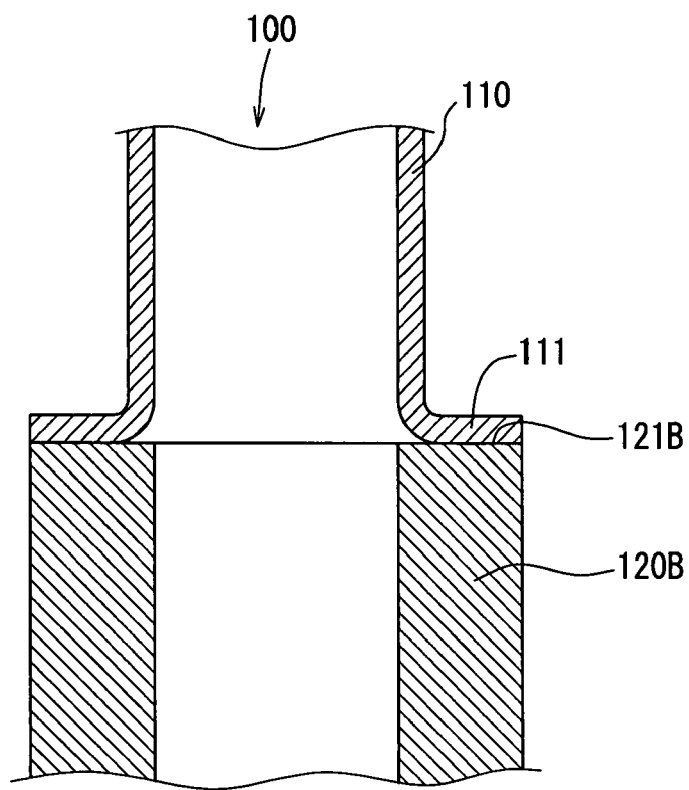
FIG. 9 is a cross-sectional view of an example of a unit of pipes joined by ultrasonic joining according to a still another embodiment of the present invention.

Then, as shown in FIG. 6C, the first and second horns 21, 22 are pressurized against the first flange portion 111 such that the projections 11a, 12a are bit into the surface of the first flange portion 111. In this condition, the first horn 21 is vibrated by the oscillator 7 in the manner shown in FIG. 5A. Thus, the vibration of the first horn 21 is transferred to the second horn 22 through the press-contact portions 2a, so the second horn 22 resonates.

In the steps shown in FIGS. 6B and 6C, a biasing-load in a range between 5000 N and 10000 N is applied to press against the first and second horns 21, 22 to each other. Since the biasing-load in the range between 5000 N and 1000 N is exerted to the press-contact portions 2a, the vibration of the first horn 21 is sufficiently transferred to the second horn 22 to resonate the second horn 22 without requiring an increase in size of the ultrasonic joining apparatus 1.

As the first and second horns 21, 22 are integrally vibrated as shown in FIG. 6C, the first flange portion 111 vibrates with the first and second horns 21, 22. At this time, oxide films and the like on the joining surfaces of the first and second flange portions 111, 121 are removed by friction between the first and second flange portions 111, 121. Therefore, newly-formed clean surfaces are generated on the first and second flange portions 111, 121, and hence the first flange portion 111 and the second flange portion 121 are joined through the newly-formed surfaces.

The press-contact portions 2a of the first and second horns 21, 22 are located in an area where the amplitude of the vibration of the first and second horns 21, 22 is high, as shown in FIG. 5B. Therefore, the vibration of the first horn 21 is properly transferred to the second horn 22. Furthermore, the first flange portion 111 is sufficiently vibrated, even at a position corresponding to and adjacent to the press-contact portions 2a. Accordingly, the first flange portion 111 and the second pressing portion 121 are properly joined to each other.

In this way, the joined pipe 100 is produced. Here, impressions due to the projections 21a, 22a of the first and second horns 21, 22 remain over the surface of the first flange 111, which is pressed by the first and second horns 21, 22 during the joining, at the substantially uniformed intervals.

In the above ultrasonic joining process, the step shown in FIG. 6B corresponds to an arranging step, and the step shown in FIG. 6C corresponds to a joining step. In the arranging step, the first horn 21 and the second horn 22 are opposed at the press-contact portions 2a and pressed against each other. Further, in the joining step, the second horn 22 is resonated by the vibration of the first horn 21 through the press-contact portions 2a.

In the above ultrasonic joining process and method, even when the horn unit 2 is constructed of the first and second horns 21, 22, the first and second horns 21, 22 are integrally vibrated. Therefore, the first flange portion 111 is joined to the second flange portion 121 stably along its circumference. Accordingly, the quality of the joined portion by this ultrasonic joining improves, as compared with a case in which horns are arranged with clearances in the circumferential direction and vibrated by respective oscillators at the same phase and the same amplitude.

Further, in the joining step, the vibration of the first horn 21 caused by the oscillator 7 is transferred to the second horn 22 through the joining portions 2a, and the second horn 22 is resonated with the vibration of the first horn 21. Because it is not necessary to individually control vibration-excitation to the first and second horns 21, 22, vibration controls of the horn unit 2 is easy. Further, because it is not necessary to provide the second horn 22 with another oscillator, a structure of the ultrasonic joining apparatus 1 is simplified.

Also, the press-contact portions 2a of the first and second horns 21, 22 are located on the opposite sides of the first pipe 110. That is, the horn unit 2 is divided into two horns 21, 22 on the plane intersecting the first pipe 110. Therefore, when the first horn 21 and the second horn 22 are opposed to and pressed to each other, the first flange portion 111 can be substantially entirely covered with the first and second horns 21, 22. As such, the vibration of the first and second horns 21, 22 is transferred to the entire surface of the first flange portion 111. Accordingly, the quality of joining further improves.

Further, the projections 21a, 22a are formed over the surfaces of the first and second horn 21, 22 at the uniformed intervals a. Therefore, even when the horn unit 2 is constructed of plural horns 21, 22, the surface of the first flange portion 111 is substantially entirely and substantially uniformly vibrated while being pressed by the plural horns 21, 22. Accordingly, the joining surfaces of the first and second flange portions 111, 121 are uniformly joined.

Figure 7:
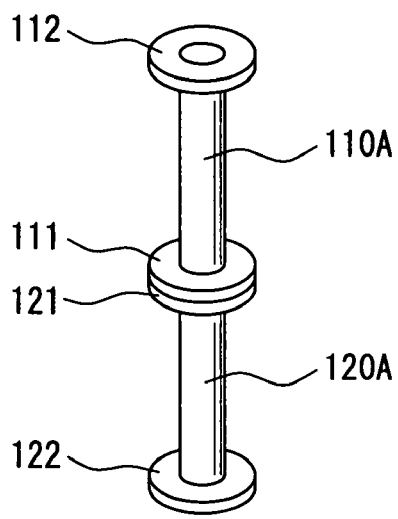
FIG. 7 is a perspective view of an example of a unit of pipes joined by ultrasonic joining according to another embodiment of the present invention.

In the above embodiment, the first pipe 110 is the bent pipe as shown in FIG. 4. However, the shape of the first pipe 110 is not limited to the illustrated shape. A pipe having an overhang portion such as a nut or a flange expanding in a radial direction can be joined by the ultrasonic joining apparatus 1 and the above discussed ultrasonic joining method. FIG. 7 shows another example of the first and second pipes joined by the ultrasonic joining apparatus 1 and the above-discussed method. For example, the first pipe 110A has flange portions 111, 112 on both ends, and the second pipe 120A has flange portions 121, 122 on both ends. The flange portion 111 of the first pipe 110A and the flange portion 121 of the second pipe 120A are joined. Further, the flange portion 122 can be joined to a portion of another member by the ultrasonic joining apparatus 1.

In the above embodiment, the horn unit 2 is constructed of the first horn 21 and the second horn 22, and the first and second horns 21, 22 are opposed to each other on the same plane. That is, the horn unit 2 is divided into horn segments on the same plane. However, the shape of division of the horn unit 2 is not limited to the above. Also, the shape of the horn segments is not limited to the shape of the first and second horns 21, 22.

Figure 8:
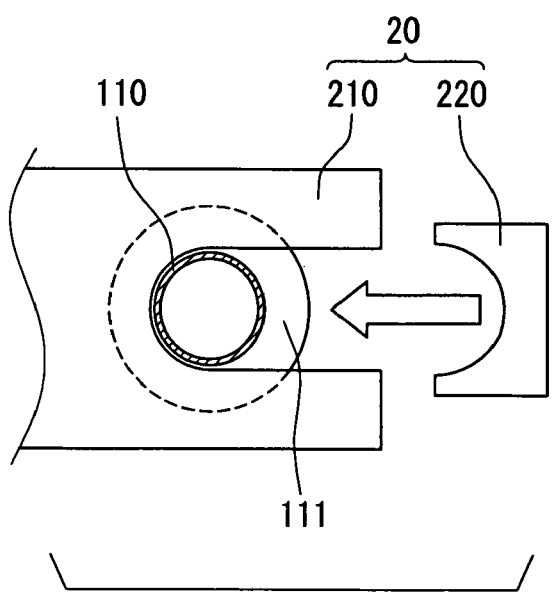
FIG. 8 is a schematic view of horns of an ultrasonic joining apparatus according to a further another embodiment of the present invention.

For example, as shown in FIG. 8, a horn unit 20 may be constructed of a first horn 210 and a second horn 220. The first horn 210 has a substantially U-shaped recess. The first pipe 110 is placed in the U-shaped recess of the first horn 210 and then the second horn 220 is arranged to the first horn 210 so as to cover an opening of the U-shaped recess of the first horn 210.

Also in this case, the first horn 210 and the second horn 220 are pressed against each other at press-contact portions thereof for resonating the second horn 220 with the first horn 210. For example, a step or a depression is formed on one side of the first horn 210 and the second horn 220 is received in the step in a press-contact manner.

Further, the horn unit 2 may include more than three horns. For example, the second horn 22 may be further divided into plural horns.

In the above embodiment, the first member 110 and the second member 120 joined by the ultrasonic joining apparatus 1 and the above discussed method have the similar pipe shape. However, the ultrasonic joining apparatus 1 and the above discussed method can be employed to join members having different shapes.

Figure 10:
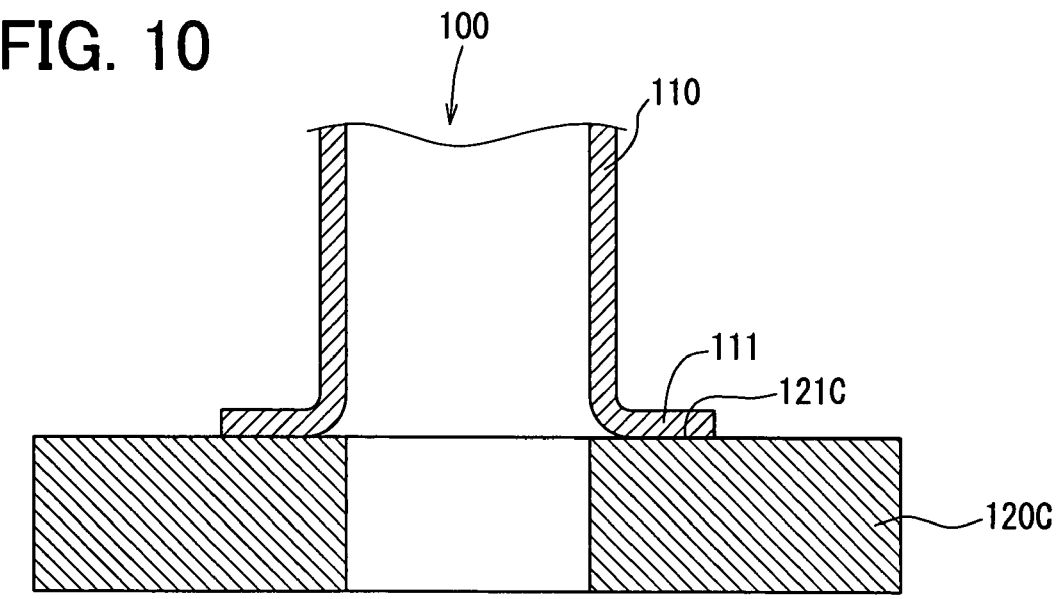
FIG. 10 is a cross-sectional view of an example of a pipe and a block member joined by ultrasonic joining according to a yet another embodiment of the present invention.

For example, the ultrasonic joining apparatus 1 and method can be employed to join the first pipe 110 to a pipe member 120B having a thickness equal to or larger than a radial dimension of the first flange portion 111 of the first pipe 110, as shown in FIG. 10. Alternatively, the ultrasonic joining apparatus 1 and the method can be employed to join the first pipe 110 to a periphery 121C of an opening of a block member 120C. The block member 120C may be any parts of objects, such as a part of a header tank of a heat exchanger and the like.

Also, the shape of opening provided by the horns 21, 22 of the horn unit 2 may be changed according to a cross-sectional shape of the tubular portion of the first pipe 110.

The above ultrasonic joining apparatus 1 and method improve the quality of joined portions of the first and second members, and are effective to join the tubular members requiring fluid-tightness. However, the ultrasonic joining apparatus 1 and method may be employed to merely join a flange portion of a member to an object. That is, the members to be joined by the ultrasonic joining apparatus 1 and method are not limited to the tubular members.

The example embodiments of the present invention are described above. However, the present invention is not limited to the above example embodiment, but may be implemented in other ways without departing from the spirit of the invention.

What is claimed is:

1. An ultrasonic joining method comprising:
arranging a first horn and a second horn of a horn unit in a circumferential direction of a flange portion of a first member on a first side of the flange portion, a second side of the flange portion, which is opposite to the first side, facing a portion of a second member, the first horn being connected to an oscillator; and
joining the flange portion to the portion of the second member by applying vibration to the flange portion by the first horn and the second horn in a condition that the first horn and the second horn are pressurized to the flange portion so that the flange portion is vibrated while being pressurized to the portion of the second member, wherein
in the arranging, the second horn is biased against the first horn such that the first horn and the second horn are in press-contact with each other at press-contact portions thereof,
in the joining, the first horn is vibrated by the oscillator and the second horn is vibrated by receiving vibration of the first horn through the press-contact portions, and the arranging includes connecting the first horn and the second horn such that a tubular portion of the first member is located in an opening defined by the first horn and the second horn.

2. The ultrasonic joining method according to claim 1, wherein
the arranging includes connecting the first horn and the second horn such that the press-contact portions are disposed on opposite sides of the first member.

3. The ultrasonic joining method according to claim 1, wherein
the arranging includes connecting the first horn and the second horn such that the press-contact portions are located in an area where amplitude of vibration of the first horn is substantially in a maximum level.

4. The ultrasonic joining method according to claim 1, wherein
the arranging includes connecting the first horn and the second horn such that a plurality of projections provided on surfaces of the first horn and the second horn are arranged at substantially uniformed intervals over the surfaces of the first horn and the second horn, the surfaces facing the first side of the flange portion.

5. The ultrasonic joining method according to claim 1, wherein
the first member has the tubular portion defining an opening therein and the flange is disposed at an end of the tubular portion, and the second member defines an opening within the portion to which the flange portion is joined, the ultrasonic joining method further comprising:
placing the flange portion onto the portion of the second member such that the opening of the tubular portion is in communication with the opening of the second member.

6. An ultrasonic joining method for joining a first member having a columnar portion and a flange portion at an end of the columnar portion and a second member, the ultrasonic joining method comprising:
placing the flange portion of the first member onto a portion of the second member;
connecting a first horn and a second horn on a side opposite to the second member with respect to the flange portion such that the columnar portion of the first member is disposed in an opening provided between the first horn and the second horn, and the first horn and the second horn are in press-contact with each other at press-contact portions thereof; and
applying vibration to the first horn by an oscillator in a condition that the first horn and the second horn are pressed against the flange portion and are in contact with each other at the press-contact portions thereof for transferring vibration of the first horn to the second horn through the press-contact portions.

* * * * *